United States Patent
Zhao et al.

(10) Patent No.: US 11,959,152 B2
(45) Date of Patent: Apr. 16, 2024

(54) METHOD FOR CLEAN METALLURGY OF MOLYBDENUM

(71) Applicant: CENTRAL SOUTH UNIVERSITY, Changsha (CN)

(72) Inventors: Zhongwei Zhao, Changsha (CN); Yongli Li, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 905 days.

(21) Appl. No.: 16/975,705

(22) PCT Filed: Apr. 26, 2019

(86) PCT No.: PCT/CN2019/084445
§ 371 (c)(1),
(2) Date: Aug. 25, 2020

(87) PCT Pub. No.: WO2019/210810
PCT Pub. Date: Nov. 7, 2019

(65) Prior Publication Data
US 2020/0399738 A1 Dec. 24, 2020

(30) Foreign Application Priority Data

May 3, 2018 (CN) .......................... 201810414821.8

(51) Int. Cl.
| C22B 34/34 | (2006.01) |
| C01G 39/02 | (2006.01) |
| C22B 1/02 | (2006.01) |
| C22B 3/06 | (2006.01) |
| C22B 3/08 | (2006.01) |
| C22B 3/10 | (2006.01) |
| C22B 3/26 | (2006.01) |
| C22B 3/38 | (2006.01) |
| C22B 3/44 | (2006.01) |

(52) U.S. Cl.
CPC .............. *C22B 34/34* (2013.01); *C01G 39/02* (2013.01); *C22B 1/02* (2013.01); *C22B 3/06* (2013.01); *C22B 3/065* (2013.01); *C22B 3/08* (2013.01); *C22B 3/10* (2013.01); *C22B 3/26* (2021.05); *C22B 3/3842* (2021.05); *C22B 3/3844* (2021.05); *C22B 3/3846* (2021.05); *C22B 3/44* (2013.01)

(58) Field of Classification Search
CPC ......... C22B 34/00; C22B 34/30; C22B 34/34; C22B 1/02; C22B 3/06; C22B 3/065; C22B 3/08; C22B 3/10; C22B 3/26; C22B 3/3842; C22B 3/3844; C22B 3/3846; C22B 3/44; C01G 39/02; Y02P 10/20

See application file for complete search history.

(56) References Cited

U.S. PATENT DOCUMENTS

| 4,278,644 A | 7/1981 | Rappas et al. | |
| 4,328,191 A * | 5/1982 | Su .............................. | C22B 3/24 423/53 |

FOREIGN PATENT DOCUMENTS

| CN | 105838908 A | 8/2016 | |
| CN | 108396141 A | 8/2018 | |
| CN | 108728674 A * | 11/2018 | ................ B22F 9/30 |

OTHER PUBLICATIONS

CN 105838908 A machine translation, translated Sep. 19, 2023, originally published Aug. 10, 2016 (Year: 2016).*
Qixiu Zhang et al., Fundamentals and Practice of Solvent Extraction in Hydrometallurgy, pp. 750, Central South University Press. 2014.
Ruifang Wu et al., MicroRNA-210 overexpression promotes psoriasis-like inflammation by inducing Th1 and Th17 cell differentiation, The Journal of Clinical Investigation, 2018, pp. 1-18.

* cited by examiner

*Primary Examiner* — Vanessa T. Luk
*Assistant Examiner* — Nikolas Takuya Pullen
(74) *Attorney, Agent, or Firm* — Bayramoglu Law Offices LLC

(57) ABSTRACT

Disclosed is a method for clean metallurgy of molybdenum, including steps: 1) roasting molybdenite with calcium to obtain calcified molybdenum calcine, and leaching the calcified molybdenum calcine with an inorganic acid to obtain a molybdenum-containing inorganic acid leachate; 2) extracting molybdenum in the leachate with a cationic extractant to obtain an organic phase loaded with molybdyl cations and a raffinate; 3) using a hydrogen peroxide solution as a stripping agent to obtain a molybdenum stripping liquor; and 4) heating the molybdenum stripping liquor to dissociate peroxymolybdic acid therein so as to form a molybdic acid precipitate, and then calcining to obtain a molybdenum trioxide product. The method solves the problem of ammonia nitrogen wastewater production and can also be used for the enrichment and recovery of rhenium.

20 Claims, No Drawings

METHOD FOR CLEAN METALLURGY OF MOLYBDENUM

CROSS REFERENCE TO THE RELATED APPLICATIONS

This application is the national phase entry of International Application No. PCT/CN2019/084445, filed on Apr. 26, 2019 which is based upon and claims priority to Chinese Patent Application No. 201810414821.8, filed on May 3, 2018, the entire contents of which are incorporated herein by reference.

TECHNICAL FIELD

The invention belongs to the technical field of non-ferrous metal metallurgy, in particular to a method for clean metallurgy of molybdenum.

BACKGROUND

Molybdenum is an important rare strategic metal. In the nature, there are more than 20 mineralization types of molybdenum, but the most important one is molybdenite ($MoS_2$), which accounts for 99% or above. Molybdenite is not only a main raw material for molybdenum metallurgy, but also one of the main sources for strategic metal rhenium.

At present, the oxidizing roasting-ammonia leaching process of molybdenite is widely used around the world, and is a classic metallurgical process of molybdenum. The classic process mainly has the following problems: (1) molybdenum trioxide is prone to sublimation and volatilization at high temperature, and oxidization of molybdenum disulfide is a strong exothermic reaction, and therefore, a large amount of air needs to be introduced to regulate furnace temperature during oxidizing roasting of molybdenite, not only making roasting difficult, but also producing a large amount of low-concentration sulfur dioxide flue gas; (2) molybdenum calcine needs ammonia dissolution to generate an ammonium molybdate solution, the ammonium molybdate solution is purified to produce ammonium molybdate, then the ammonium molybdate is further calcined to form molybdenum trioxide, and since ammonia is used in this process, ammonia nitrogen wastewater and waste gas are inevitably produced; (3) rhenium in molybdenite, mainly existing in a form of $ReS_2$, is oxidized to $Re_2O_7$ during the oxidizing roasting, volatilized with the flue gas, and finally recovered from an eluent, causing a rhenium recovery rate of only about 50%, which is very low.

During the roasting of molybdenite, adding lime can fix sulfur and avoid the volatilization of molybdenum, and also can facilitate the recovery of rhenium. However, molybdenum is combined to form more stable calcium molybdate which cannot be leached with ammonia any more. Thus, sulfuric acid leaching-anion extraction is used first, and then a reaction with ammonia to strip is performed to obtain an ammonium molybdate solution. In this way, the ammonia nitrogen process in the latter part still exists.

Molybdenite can also be oxidized and leached by a whole wet method in a autoclave with titanium underlayment, which has the advantage of high recovery rate of molybdenum and rhenium. However, oxidization of molybdenite is a strong exothermic reaction, which makes the temperature of the closed autoclave to rise up to 180° C. to 220° C. during reaction, the pressure in the autoclave to even once approach 40 atmospheres, and the reaction time to be up to 6 h. An oxygen autoclaving process has high requirements on equipment and operation, and the autoclave with titanium underlayment is prone to burning and explosion in the autoclave under the conditions of high-speed airflow, high temperature and high oxygen pressure, causing safety hazards.

In addition, molybdenite can be decomposed by strong oxidants such as chlorine gas and high-concentration nitric acid under normal pressure, but there are problems of environmental protection, transportation, cost and the like which need to be solved.

To sum up, the current molybdenum metallurgy process has the problems such as sulfur dioxide pollution, ammonia nitrogen wastewater discharge, complex process flow, and low recovery rate of associated element rhenium. For these problems, there is a need to develop clean and efficient novel molybdenum metallurgy process through theoretical innovations.

SUMMARY

The invention is directed to provide a method for clean metallurgy of molybdenum to solve the environmental pollution problem in an existing molybdenite smelting process, especially the problem of ammonia nitrogen wastewater production, and at the same time to solve the problem in the recycling of the leachate to realize the enrichment of the associated element rhenium and facilitate the recovery.

A technical solution for implementing the invention is as follows.

A method for clean metallurgy of molybdenum includes steps:

1) roasting molybdenite with calcium to obtain calcified molybdenum calcine, and leaching the calcified molybdenum calcine with an inorganic acid to obtain a molybdenum-containing inorganic acid leachate;

2) extracting molybdenum in the leachate obtained in step 1) with a cationic extractant to obtain an organic phase loaded with molybdyl cations ($MoO_2^{2+}$) and a raffinate, where the cationic extractant is one or more of P507, P204 or Cyanex272;

3) using a hydrogen peroxide solution as a stripping agent, and mixing the hydrogen peroxide solution with the organic phase loaded with molybdyl cations to obtain a molybdenum stripping liquor; and 4) heating the molybdenum snipping liquor to dissociate peroxymolybdic acid therein so as to form a molybdic acid precipitate, and then calcining to obtain a molybdenum trioxide product.

Step 1) is leaching with the inorganic acid under normal pressure and at 75 to 96° C., and the inorganic acid is one or more of sulfuric acid, nitric acid, and hydrochloric acid.

Step 1) is leaching with the inorganic acid under normal pressure and at 85 to 95° C., and the leaching time is 2 h to 6 h.

Preferably, in step 1), a concentration of the inorganic acid is 2 to 4 mol/L, and a leachate to solid ratio (L/kg) is 3:1 to 10:1.

In step 2), the cationic extractant is prepared into a kerosene solution before being added, and a volume fraction of the cationic extractant in the kerosene solution is 10% to 50%.

The raffinate obtained in step 2) is recycled to step 1) for use after being supplemented with the inorganic acid consumed in the leaching process, and the recycling is carried out multiple times for the enrichment and recovery of rhenium.

Rhenium is an irreplaceable strategic metal for aero-engines, and is of great significance to national defense construction. Molybdenite is often associated with trace element rhenium, and is one of the main sources for rhenium. Through calcium roasting, $ReS_2$ is converted into calcium rhenate, which is leached together with molybdenum during the leaching of the inorganic acid. Under a relatively strong acidic condition, molybdenum exists in a form of molybdyl cation ($MoO_2^{2+}$), while rhenium exists in a form of rhenate anion ($ReO_4^-$). During cation extraction, molybdenum is extracted, but rhenium remains in the raffinate. Through the recycling use of the raffinate, rhenium is gradually enriched, and rhenium is recovered by an anion extraction or ion exchange mode.

In step 2), an extraction phase ratio (O/A) is 2:1 to 1:3. Multistage counter-current extraction is used, and a number of stages of extraction is 3 to 5.

In step 3), a mass concentration of hydrogen peroxide is 10% to 20%, and a stripping phase ratio (O/A) is 3:1 to 5:1.

Preferably, step 3) uses multistage counter-current stripping, and a number of stages of stripping is 2 to 5.

In step 4), the molybdenum-containing hydrogen peroxide solution is heated to 90 to 100° C. to dissociate a peroxygen bond therein.

Molybdenum has two important polyacid chemical features in an aqueous solution.

On one hand, molybdenum mainly exists in a form of isopolyacid polyanion such as $Mo_7O_{24}^{6-}$ and $Mo_8O_{26}^{4-}$ under a weakly acidic condition, and when pH<2, isopolyacid polyanions of molybdenum begin to dissociate and are gradually converted into molybdyl cations ($MoO_2^{2+}$).

On the other hand, in an acidic solution, molybdenum tends to react with hydrogen peroxide and is converted into peroxide anions ($[Mo_2O_{11}(H_2O)_2]^{2-}$).

Using the above two properties of molybdenum, and combining the calcium roasting of molybdenite, with the calcified molybdenum calcine of molybdenite as the raw material, the inventor breaks through the traditional molybdenum metallurgy ammonia nitrogen process, and provides a novel ammonia nitrogen-free molybdenum clean metallurgy process theoretically based on "cation extractant extracting molybdyl cations-hydrogen peroxide as stripping agent selectively stripping molybdenum".

The clean metallurgical process method provided by the invention greatly simplifies the molybdenum smelting process, completely solves the problems of sulfur dioxide pollution and ammonia nitrogen wastewater production, has the technical characteristics of short process, cleanness and efficiency, and is easy to industrially popularize.

DETAILED DESCRIPTION OF THE EMBODIMENTS

The following further describes the technical solutions of the invention by using specific embodiments, A person skilled in the art should know that, the embodiments are only used to illustrate the invention, and are not used to limit the scope of the invention.

In embodiments, unless otherwise specified, the technical means used are conventional ones in the art.

Embodiment 1

(1) Calcified molybdenum calcine of molybdenite is used as a raw material, a molybdenum content is 13.2%, under normal pressure and at 95° C., 4 mol/L nitric acid is used for leaching, a leachate to solid ratio (L/kg) is 3:1 and the leaching time is 2 h, so that a molybdenum-containing nitric acid leachate with a molybdenum leaching rate of 99.2% is obtained.

(2) 10% P507+90% sulfonated kerosene are used as an extractant, the extraction of molybdenum is carried out under a condition of an extraction phase ratio O/A=2:1, an extraction mode is 5-stage counter-current extraction, and an extraction rate of molybdenum can be up to 9:5% or above. A loaded organic phase and a raffinate are obtained by extraction. The loaded phase is subjected to molybdenum stripping, and the raffinate is recycled to step (1) for use after being supplemented with the nitric acid consumed in the leaching process.

(3) Hydrogen peroxide with a mass concentration of 10% is used as a stripping agent, the obtained loaded organic phase is stripped under a condition of a phase ratio O/A=5:1. After 5-stage counter-current stripping, molybdenum can be completely stripped to obtain a molybdenum-containing hydrogen peroxide stripping liquor with a molybdenum concentration of about 103.6 g/L.

(4) The molybdenum-containing hydrogen peroxide solution is heated to 90° C. to dissociate a peroxygen bond therein so as to form a molybdic acid precipitate (a molybdenum precipitation rate is about 93.2%), and then calcination is carried out to obtain a molybdenum trioxide product.

Calcium oxide is added to a crystallization mother liquor to recover uncrystallized molybdenum with a direct molybdenum recovery rate of 87.6%.

Embodiment 2

(1) Calcified molybdenum calcine of molybdenite is used as a raw material, a molybdenum content is 14.5%, under normal pressure and at 85° C., 3 mol/L hydrochloric acid is used for leaching, a leachate to solid ratio (L/kg) is 5:1 and the leaching time is 4 h, so that a molybdenum-containing hydrochloric acid leachate with a molybdenum leaching rate of 99.5% is obtained.

(2) 30% Cyanex272+70% sulfonated kerosene are used as an extractant, the extraction of molybdenum is carried out under a condition of an extraction phase ratio O/A=1:1, an extraction mode is 3-stage counter-current extraction, and an extraction rate of molybdenum can be up to 90.5% or above. A loaded organic phase and a raffinate are obtained by extraction. The loaded phase is subjected to molybdenum stripping, and the raffinate is recycled to step (1) for use after being supplemented with the hydrochloric acid consumed in the leaching process.

(3) A hydrogen peroxide solution with a mass concentration of 20% is used as a stripping agent, the Obtained loaded organic phase is stripped under a condition of a phase ratio O/A=4:1. After 2-stage counter-current stripping, molybdenum can be completely stripped to obtain a molybdenum-containing hydrogen peroxide stripping liquor with a molybdenum concentration of about 104.8 g/L.

(4) The molybdenum-containing hydrogen peroxide solution is heated to 100° C. to dissociate a peroxygen bond therein so as to form a molybdic acid precipitate (a molybdenum precipitation rate is about 93.3N), and then calcination is carried out to obtain a molybdenum trioxide product. Calcium oxide is added to a crystallization mother liquor to recover uncrystallized molybdenum with a direct molybdenum recovery rate of about 84.1%.

Embodiment 3

(1) Calcified molybdenum calcine of molybdenite is used as a raw material, a molybdenum content is 12.5%, under normal pressure and at 75° C., 2 mol/L sulfuric acid is used for leaching, a leachate to solid ratio (L/kg) is 10:1 and the leaching time is 6 h, so that a molybdenum-containing sulfuric acid leachate with a molybdenum leaching rate of 99.6% is obtained.

(2) 50% P204+50% sulfonated kerosene are used as an extractant, the extraction of molybdenum is carried out under a condition of an extraction phase ratio O/A=1:3, an extraction mode is 5-stage counter-current extraction, and an extraction rate of molybdenum can be up to 99.1% or above. A loaded organic phase and a raffinate are obtained by extraction. The loaded phase is subjected to molybdenum stripping, and the raffinate is recycled to step (1) for use after being supplemented with the sulfuric acid consumed in the leaching process.

(3) A hydrogen peroxide solution with a mass concentration of 15% is used as a stripping agent, the obtained loaded organic phase is stripped under a condition of a phase ratio O/A=3:1. After 4-stage counter-current stripping, molybdenum can be completely stripped to obtain a molybdenum-containing hydrogen peroxide stripping liquor with a molybdenum concentration of about 111 g/L.

(4) The molybdenum-containing hydrogen peroxide solution is heated to 95° C. to dissociate a peroxygen bond therein so as to form a molybdic acid precipitate (a molybdenum precipitation rate is about 93.7%), and then calcination is carried out to obtain a molybdenum trioxide product. Calcium oxide is added to a crystallization mother liquor to recover uncrystallized molybdenum with a direct molybdenum recovery rate of about 92.5%.

Embodiment 4

(1) Calcified molybdenum calcine of molybdenite is used as a raw material, a molybdenum content is 12.5%, under normal pressure and at 75° C., the raffinate of Embodiment 3 is used and the concentration of the sulfuric acid supplemented into the raffinate is made to 2 mol/L for circulation leaching, a leachate to solid ratio (L/kg) is 10:1 and the leaching time is 6 h, so that a molybdenum-containing sulfuric acid leachate with a molybdenum leaching rate of 99.2% is obtained.

(2) 50% P204+50% sulfonated kerosene are used as an extractant, the extraction of molybdenum is carried out under a condition of an extraction phase ratio O/A=1:3, an extraction mode is 5-stage counter-current extraction, and an extraction rate of molybdenum is about 98.9%. A loaded organic phase and a raffinate are obtained by extraction. The loaded phase is subjected to molybdenum stripping, and the raffinate is recycled to step (1) for use after being supplemented with the sulfuric acid consumed in the leaching process.

(3) A hydrogen peroxide solution with a mass concentration of 15% is used as a stripping agent, the obtained loaded organic phase is stripped under a condition of a phase ratio O/A=3:1. After 4-stage counter-current stripping, molybdenum can be completely stripped to obtain a molybdenum-containing hydrogen peroxide stripping liquor with a molybdenum concentration of about 110 g/L.

(4) The molybdenum-containing hydrogen peroxide solution is heated to 95° C. to dissociate a peroxygen bond therein so as to form a molybdic acid precipitate (a molybdenum precipitation rate is about 93.4%), and then calcination is carried out to obtain a molybdenum trioxide product. Calcium oxide is added to a crystallization mother liquor to recover uncrystallized molybdenum with a direct molybdenum recovery rate of about 91.6%.

After recycling is carried out multiple times as described in Embodiment 4, and the concentration of rhenium is enriched to 0.3 to 0.5 g/L, rhenium is recovered by using an anion extractant or anion exchange resin.

The foregoing embodiments merely describe the specific implementations of the invention, but are not intended to limit the scope of the invention. A person skilled in the art may further make various modifications or changes based on the prior art. Various modifications and variations made by a person of ordinary skill in the art without departing from the design spirit of the invention shall fall within the protection scope of the claims of the invention.

What is claimed is:
1. A method for clean metallurgy of molybdenum, comprising the following steps:
   1) roasting molybdenite with calcium to obtain a calcified molybdenum calcine, and leaching the calcified molybdenum calcine with an inorganic acid to obtain a molybdenum-containing inorganic acid leachate;
   2) extracting molybdenum in the molybdenum-containing inorganic acid leachate obtained in step 1) with a cationic extractant to obtain an organic phase loaded with molybdyl cations and a raffinate, wherein the cationic extractant is one or more of P204, P507 or Cyanex272;
   3) using a hydrogen peroxide solution as a stripping agent, and mixing the hydrogen peroxide solution with the organic phase loaded with molybdyl cations to obtain a molybdenum stripping liquor; and
   4) heating the molybdenum stripping liquor to dissociate peroxymolybdic acid therein so as to form a molybdic acid precipitate, and then calcining to obtain a molybdenum trioxide product.

2. The method for clean metallurgy of molybdenum according to claim 1, wherein step 1) is leaching with the inorganic acid under a normal pressure and at a temperature of 75 to 96° C., and the inorganic acid is one or more of sulfuric acid, nitric acid, and hydrochloric acid.

3. The method for clean metallurgy of molybdenum according to claim 2, wherein step 1) is leaching with the inorganic acid under the normal pressure and at a temperature of 85 to 95° C., and a leaching time is 2 h to 6 h.

4. The method for clean metallurgy of molybdenum according to claim 3, wherein step 3) uses multistage counter-current stripping, and a number of stages of stripping is 2 to 5.

5. The method for clean metallurgy of molybdenum according to claim 3, wherein in step 4), the molybdenum stripping liquor is heated to 90 to 100° C. to dissociate a peroxygen bond therein.

6. The method for clean metallurgy of molybdenum according to claim 2, wherein step 3) uses multistage counter-current stripping, and a number of stages of stripping is 2 to 5.

7. The method for clean metallurgy of molybdenum according to claim 2, wherein in step 4), the molybdenum stripping liquor is heated to 90 to 100° C. to dissociate a peroxygen bond therein.

8. The method for clean metallurgy of molybdenum according to claim 1, wherein in step 1), a concentration of the inorganic acid is 2 to 4 mol/L, and a leachate to solid ratio (L/kg) is 3:1 to 10:1.

9. The method for clean metallurgy of molybdenum according to claim 8, wherein step 3) uses multistage counter-current stripping, and a number of stages of stripping is 2 to 5.

10. The method for clean metallurgy of molybdenum according to claim 8, wherein in step 4), the molybdenum stripping liquor is heated to 90 to 100° C. to dissociate a peroxygen bond therein.

11. The method for clean metallurgy of molybdenum according to claim 1, wherein in step 2), the cationic extractant is a mixed with kerosene to obtain a kerosene solution before being added to the Molybdenum-containing inorganic acid leachate, wherein a volume fraction of the cationic extractant in the kerosene solution is 10% to 50%.

12. The method for clean metallurgy of molybdenum according to claim 11, wherein step 3) uses multistage counter-current stripping, and a number of stages of stripping is 2 to 5.

13. The method for clean metallurgy of molybdenum according to claim 1, wherein the raffinate obtained in step 2) is recycled to be mixed with additional calcified molybdenum calcine in a further leaching process after being supplemented with the inorganic acid consumed in the leaching process of step 1), and recycling of raffinate is carried out multiple times producing a rhenium enriched raffinate and then rhenium is recovered from the rhenium enriched raffinate with an anion extractant or anion exchange resin.

14. The method for clean metallurgy of molybdenum according to claim 13, wherein step 3) uses multistage counter-current stripping, and a number of stages of stripping is 2 to 5.

15. The method for clean metallurgy of molybdenum according to claim 1, wherein in step 2), an extraction phase ratio (O/A) is 2:1 to 1:3; and multistage counter-current extraction is used, and a number of stages of extraction is 3 to 5.

16. The method for clean metallurgy of molybdenum according to claim 15, wherein step 3) uses multistage counter-current stripping, and a number of stages of stripping is 2 to 5.

17. The method for clean metallurgy of molybdenum according to claim 1, wherein in step 3), a mass concentration of the hydrogen peroxide solution is 10% to 20%, and a stripping phase ratio (O/A) is 3:1 to 5:1.

18. The method for clean metallurgy of molybdenum according to claim 17, wherein step 3) uses multistage counter-current stripping, and a number of stages of stripping is 2 to 5.

19. The method for clean metallurgy of molybdenum according to claim 1, wherein step 3) uses multistage counter-current stripping, and a number of stages of stripping is 2 to 5.

20. The method for clean metallurgy of molybdenum according to claim 1, wherein in step 4), the molybdenum stripping liquor—is heated to 90 to 100° C. to dissociate a peroxygen bond therein.

* * * * *